(12) United States Patent
Guio et al.

(10) Patent No.: US 7,649,862 B2
(45) Date of Patent: Jan. 19, 2010

(54) FLEXIBLE THROUGH-CONNECTION PROCESS IN A MOBILE SWITCH CENTER WHEN MULTIPLE OUTGOING CALL LEGS INVOLVED

(75) Inventors: Julian Maurico Guio, Glen Ellyn, IL (US); Jason T. Kuo, Naperville, IL (US); Ismael Lopez, Berwyn, IL (US); Huixian Song, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 466 days.

(21) Appl. No.: 11/132,511

(22) Filed: May 19, 2005

(65) Prior Publication Data

US 2006/0262746 A1   Nov. 23, 2006

(51) Int. Cl.
  *H04Q 7/00* (2006.01)
(52) U.S. Cl. .................. 370/329; 455/453; 455/428; 455/427; 455/426.1; 455/12.1; 455/512; 455/445; 379/222; 379/229; 379/279; 379/280; 370/337; 370/311; 712/203; 712/233; 712/25; 712/35
(58) Field of Classification Search ............ 455/427, 455/428, 453, 426.1, 445, 1, 12.1, 512; 379/222, 379/229, 279, 280; 340/7.22, 7.28; 370/329, 370/351, 401
  See application file for complete search history.

(56) References Cited

U.S. PATENT DOCUMENTS

| | | | | |
|---|---|---|---|---|
| 3,564,149 A | * | 2/1971 | Funk et al. | 379/222 |
| 5,892,934 A | * | 4/1999 | Yard | 712/203 |
| 5,940,756 A | * | 8/1999 | Sibecas et al. | 455/426.1 |
| 5,978,366 A | * | 11/1999 | Massingill et al. | 370/337 |
| 6,058,307 A | * | 5/2000 | Garner | 455/428 |
| 6,112,085 A | * | 8/2000 | Garner et al. | 455/428 |
| 6,243,572 B1 | * | 6/2001 | Chow et al. | 455/408 |
| 6,243,580 B1 | * | 6/2001 | Garner | 455/428 |
| 6,278,876 B1 | * | 8/2001 | Joshi et al. | 455/427 |
| 6,424,835 B1 | * | 7/2002 | Shin | 455/445 |
| 6,542,739 B1 | * | 4/2003 | Garner | 455/427 |
| 6,738,472 B1 | * | 5/2004 | Mayron | 379/229 |
| 2002/0077105 A1 | * | 6/2002 | Chang | 455/436 |
| 2005/0054348 A1 | * | 3/2005 | Turina et al. | 455/453 |

* cited by examiner

*Primary Examiner*—Rafael Pérez-Gutiérrez
*Assistant Examiner*—Joseph Arevalo
(74) *Attorney, Agent, or Firm*—Patton Boggs, LLP

(57) ABSTRACT

The flexible through-connection process, operational in a Mobile Switch Center, that provides support for allowing the call routing processor of the Mobile Switch Center to independently perform a through-connection/switch-connection based on different types of calls so that the Mobile Switch Center can make a through-connection at different stages of the outgoing call leg. In operation, the present flexible through-connection process includes in the call control processor of the switching system a new parameter in the existing inter-process message which is sent to the call routing processor at call setup time. The values supported for this new parameter will be pre-defined in the Mobile Switch Center and used by the call routing processor to determine when to perform through-connection/switch-connection for an outgoing call leg. When the call routing processor routs the call out and the outgoing call is at the stage, in which the value of the parameter received is defined for, it performs a through-connection operation. Additionally this flexible through-connection process automatically disconnects the other call leg, i.e., switches the connection from one called leg to another called leg when multiple call legs are involved for an incoming call.

10 Claims, 4 Drawing Sheets

FLEXIBLE THROUGH-CONNECTION PROCESS IN A MOBILE SWITCH CENTER WHEN MULTIPLE OUTGOING CALL LEGS INVOLVED

FIELD OF THE INVENTION

This invention relates to mobile telephone networks and to a process which enables the Mobile Switch Center to more efficiently make a through-connection in the forward direction at a different stage of the outgoing call leg based on its call type and automatically (without using extra call processor time) drop the other outgoing call leg, which is already connected to the incoming call, when multiple outgoing call legs are involved for a particular incoming call.

PROBLEM

It is a problem in mobile telephone networks that customers request that new applications, such as Customer Ring Back Tone (CRBT) Service, be supported on their Mobile Switch Center (MSC). The CRBT service is a very popular service with mobile subscribers and wireless service providers. The mobile subscriber who purchases this service can choose whether a pre-selected tone, melody, commercial message, or a specific sound is provided to a particular calling subscriber station instead of the traditional audible ring tone, from the time the incoming call arrives to the time when the called mobile subscriber station answers, or when the call is being forwarded, or until "no page response" or "no answer" is detected by the mobile telephone network.

With the Customer Ring Back Tone application supported on a Mobile Switch Center, when an incoming call from Public Switched Telephone Network (PSTN) arrives at a Mobile Switch Center (Originating Mobile Switch Center) for a called mobile subscriber station served by the Originating Mobile Switch Center, the Originating Mobile Switch Center sends a query message to the Home Location Register (HLR) associated with the called mobile subscriber station's directory number. When the HLR determines that the called mobile subscriber station has CRBT service active in its subscriber record, it returns the CRBT service indicator and CRBT routing digits to the Originating Mobile Switch Center in the query return result. Upon receiving the query return result from the HLR, the Originating Mobile Switch Center sets up a call to the Customer Ring Back Tone Server, which provides the desired CRBT treatment mentioned above to the calling subscriber station, via sending an Initial Address Message (for instance, IAM message in ISUP protocol) out through the Public Switched Telephone Network to the CRBT Server.

When the Customer Ring Back Tone Server responds with an Address Complete Message (for instance, ACM message in ISUP protocol) through the Public Switched Telephone Network, the Mobile Switch Center makes a through-connection and connects the outgoing call path (to the CRBT Server) to the incoming call path to the calling subscriber station. When the CRBT Server answers the call, the calling subscriber station hears the CRBT treatment. While the calling subscriber station is hearing the CRBT treatment, the Originating Mobile Switch Center sets up a new outgoing call leg to the called mobile subscriber station. If the called mobile subscriber station answers the call, i.e., an Answer message (for instance, ANM message in ISUP protocol) is received, the Originating Mobile Switch Center needs to disconnect the CRBT Server from the calling subscriber station and connect the calling subscriber station to the called mobile subscriber station. In other words, the Originating Mobile Switch Center needs to make another through-connection to the called mobile subscriber station after disconnecting the CRBT call leg from the calling subscriber station. If the called mobile subscriber station does not answer the call and the conditions for activating the call forwarding feature are met, the call is forwarded, i.e., the Originating Mobile Switch Center needs to set up another call to the forward subscriber station. For forwarded calls, the Originating Mobile Switch Center needs to disconnect the CRBT Server from the calling subscriber station and connect the forward call leg to it when an Address Complete Message (ACM) is received, i.e., switch connection before the forwarded call is answered.

Therefore, for the Customer Ring Back Tone service, the through-connection for an incoming call to an outgoing call leg is dynamic when multiple called legs are involved for an incoming call. It depends on the type of outgoing call leg, such as call completion, call forwarding, call to CRBT Server, and so on. When more flavors of through-connection/switch-connection are introduced or involved, it is very complicated and difficult to maintain this functionality in the software based on present implementation of these services in the Mobile Switch Center.

Additionally, in a switching system, such as a Mobile Switch Center, there are two processors involved in the through-connection/switch-connection operations: the call control processor and the call routing processor. In the present implementation of through-connection/switch-connection operations, when multiple called legs are involved for a particular incoming call, the call control processor instructs the call routing processor to connect/disconnect the outgoing call leg to/from the incoming call leg via sending an inter-process message each time when the connection/disconnection operation is required. The call routing processor also has to send some inter-processor messages back to the call control processor to inform the call control processor that the connection/disconnection operation is completed. Therefore, when a switch-connection operation is involved, i.e., connecting a new outgoing call leg to the incoming call leg before dropping the other one, the system processor time is increased tremendously so that the system performance/capacity is seriously degraded; also the calling subscriber station hears a period of silence (a gap—from the time the system disconnects one leg from the calling subscriber station to connect another leg to the calling subscriber station) during switch-connection operation, which decreases the user's satisfaction with the service.

SOLUTION

The above-described problems are solved and a technical advance achieved by the present flexible through-connection process, operational in a Mobile Switch Center, that provides support for allowing the call routing processor of the Mobile Switch Center to independently perform a through-connection and/or a switch-connection based on different types of calls so that the Mobile Switch Center can make a through-connection and/or a switch-connection at different stages of the outgoing call leg. The different stages of the outgoing call leg may include: Initial Address Message (IAM) sent, Address Complete Message received, call answered, call is being forwarded, a seizure signal sent (for an outgoing trunk using Multi-Frequency [MF] signaling), and so on. In the operation of the present flexible through-connection process, the call control processor of the Mobile Switch Center uses a new parameter in the existing inter-process message which is sent to the call routing processor at call setup time. The values supported for this new parameter are pre-defined in the Mobile Switch Center and used by the call routing processor to determine when to perform through connection/switch-connection for an outgoing call leg. When the call routing processor routes the call out and the outgoing call is at the proper stage, as defined by the value of the received parameter, the call routing processor performs a through-connection operation, independent of the call control processor, thereby saving on inter-processor messages.

Additionally, this flexible through-connection process automatically disconnects the other call leg, i.e., switches the connection from one called leg to another called leg when multiple call legs are involved for an incoming call. No extra inter-process message is needed for the disconnection operation. Therefore, the Mobile Switch Center call processor time is utilized efficiently; the performance impact on the Mobile Switch Center and the gap from the time the Mobile Switch Center disconnects one leg to connect another leg to the calling subscriber station is reduced to minimum.

DETAILED DESCRIPTION OF THE DRAWINGS

Figure 1:
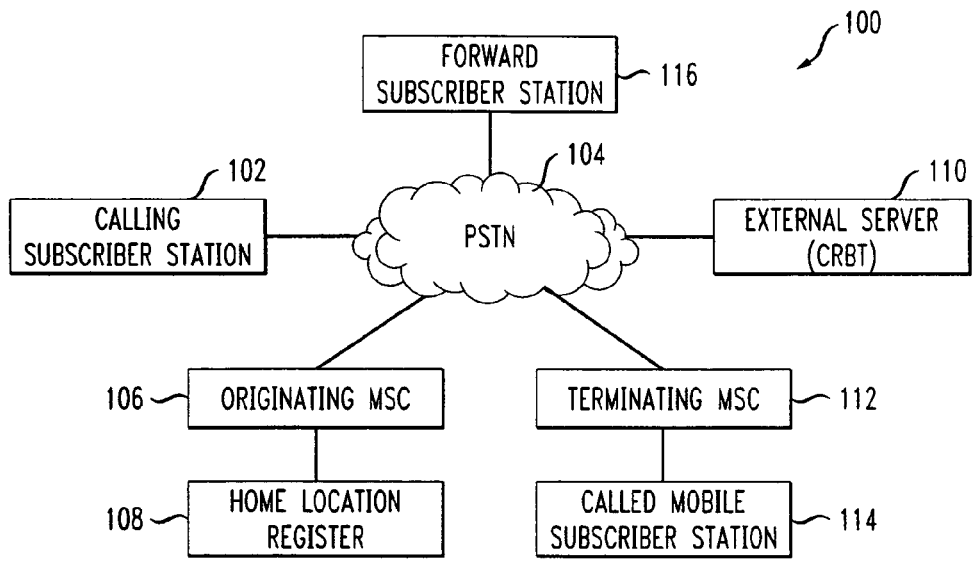
FIGS. 1 and 2 illustrate the network configuration and network elements of the present flexible through-connection process, as involved in a Customer Ring Back Tone application in a mobile telephone network environment and the signal flow among these network elements, respectively.
Figure 2:
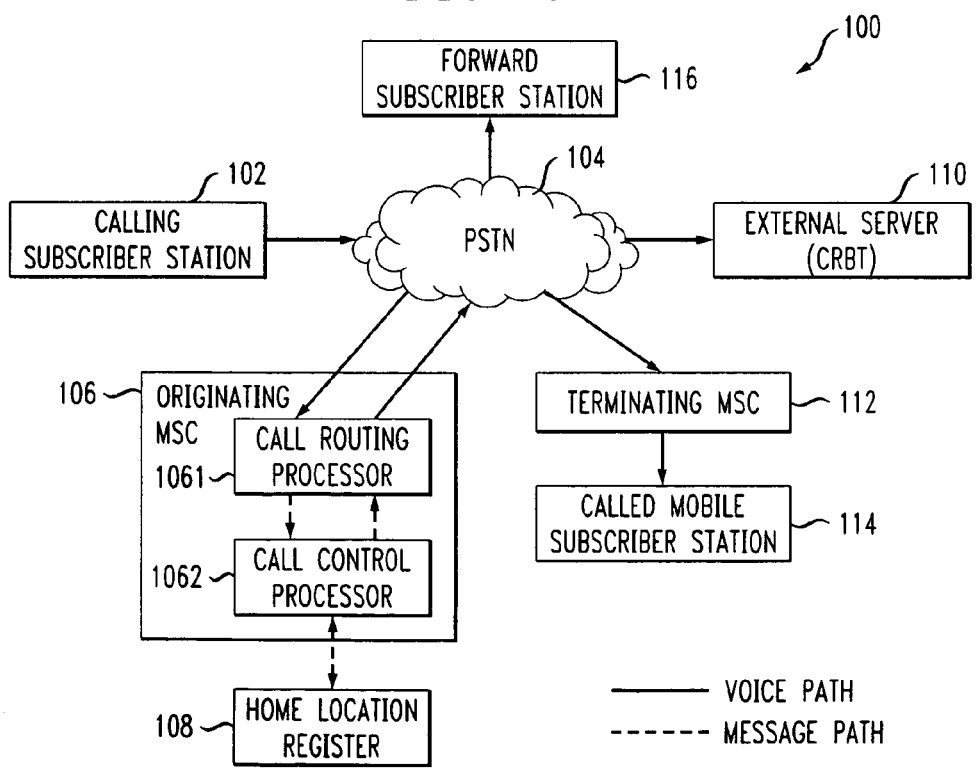

FIGS. 1 and 2 illustrate the network configuration and network elements of the present flexible through-connection process, as involved in a Customer Ring Back Tone application in a mobile telephone network environment and the signal flow among these network elements, respectively. The mobile telephone network 100 includes an Originating Mobile Switch Center 106 and a Terminating Mobile Switch Center 112, which are interconnected by the Public Switched Telephone Network 104. There is a Home Location Register 108 associated with the Originating Mobile Switch Center 106. These elements are well known in mobile telephone networks and are not described in detail herein. In addition, FIG. 1 illustrates a number of mobile subscriber stations and identifies them by their role in the call connections: calling subscriber station 102, called mobile subscriber station 114, and forward subscriber station 116. An external server 110 is also connected to Public Switched Telephone Network 104 and functions to provide auxiliary services, such as Customer Ring Back Tone Service.

The present flexible through-connection process executes a series of functions which allow the call control processor 1062 of the Mobile Switch Center 106 to instruct the call routing processor 1061 to make a through-connection based on different types of calls by including a through-connection indicator that is included in an existing inter-process message at call setup time. The call routing processor 1061 then is capable of making a through-connection at different stages of the call based on the value of the through-connection indicator received and automatically disconnects the other outgoing call leg, independent of the call control processor 1062, i.e., switch the connection from one outgoing call leg to another when multiple outgoing call legs are involved for the incoming call. Because no inter-process messages are needed between the call control processor 1062 and the call routing processor 1061 for switch-connection operation, the Mobile Switch Center call processor time is efficiently utilized; the system performance impact on the Mobile Switch Center and the gap from the time the Mobile Switch Center disconnects one outgoing call leg to connecting another outgoing call leg is minimized.

This through-connection indication may include any of a number of possible options, including but not limited to:
1. Through-connection upon Address Complete Message without switch-connection (for the first outgoing call leg, such as call leg towards Customer Ring Back Tone server).
2. Through-connection upon Address Complete Message received with switch-connection.
3. Through-connection upon Answer message (ANM) received without switch-connection.
4. Through-connection upon Answer message (ANM) with switch-connection.
5. Immediate through-connection with switch-connection (for multiple leg case and outgoing trunk is Multi-Frequency (MF) signaling).
6. Additional through-connection flavors/values that can be introduced.

ILLUSTRATIVE EXAMPLE OF A THROUGH-CONNECTION PROCESS

The following example illustrates the operation of the present flexible through-connection process in the case of a mobile subscriber station 114 that has Customer Ring Back Tone (CRBT) service active and provisioned in the system database (Home Location Register [HLR] 108).

Figure 3:
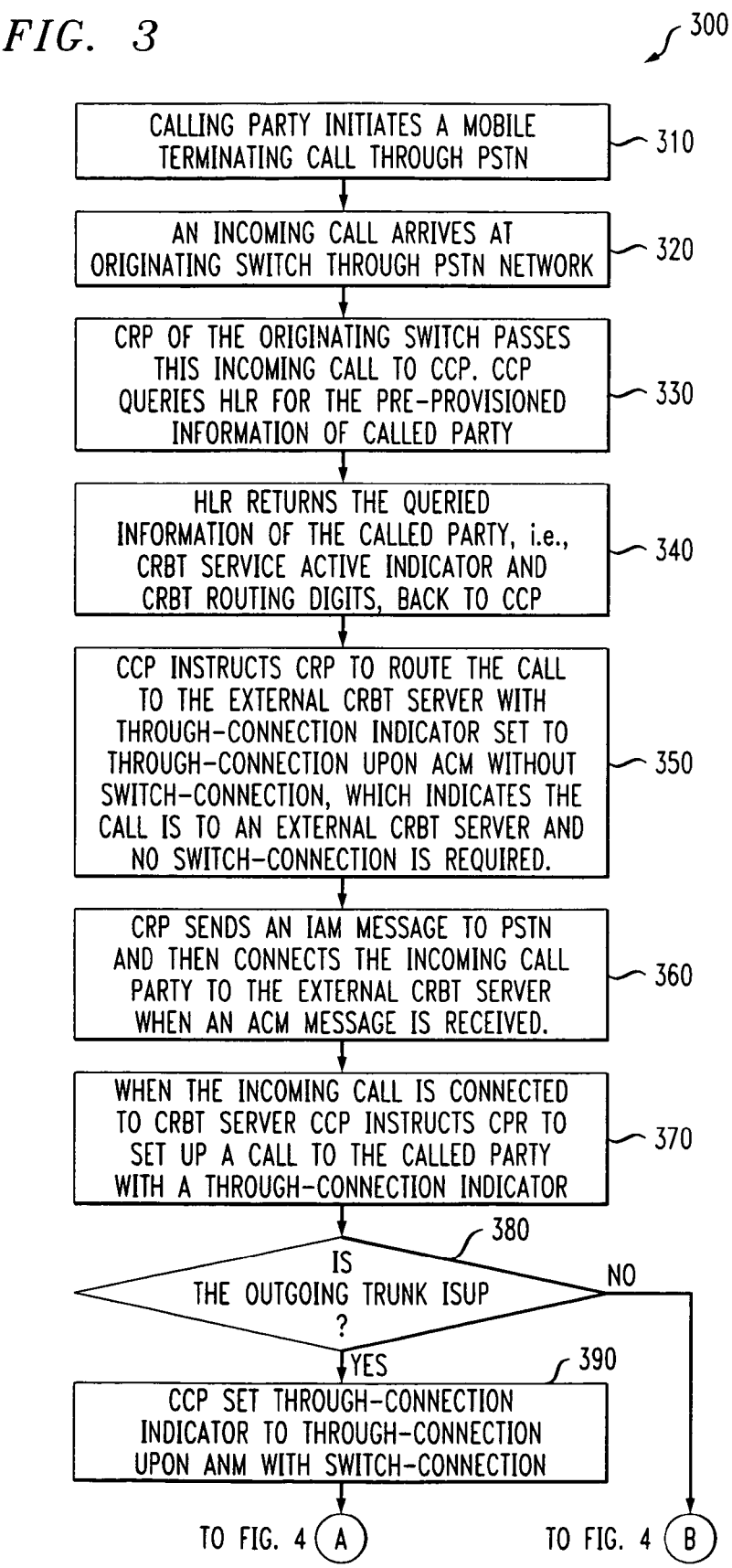
FIGS. 3, 4, and 5 illustrate in flow diagram form the operation of the Call Control Processor (CCP) and the Call Routing Processor (CRP) of the Mobile Switch Center for flexible through-connection/switch-connection operations.
Figure 4:
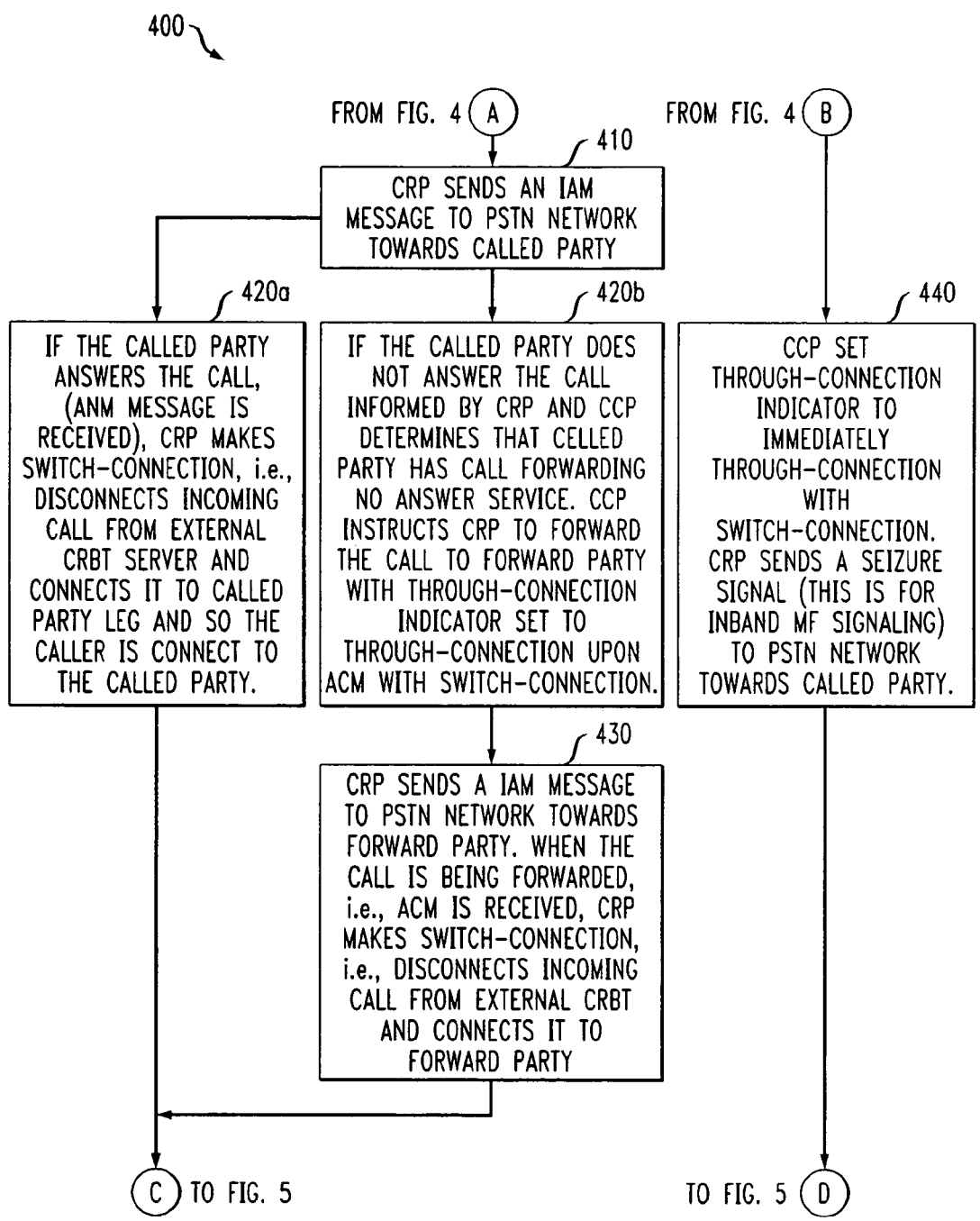
Figure 5:
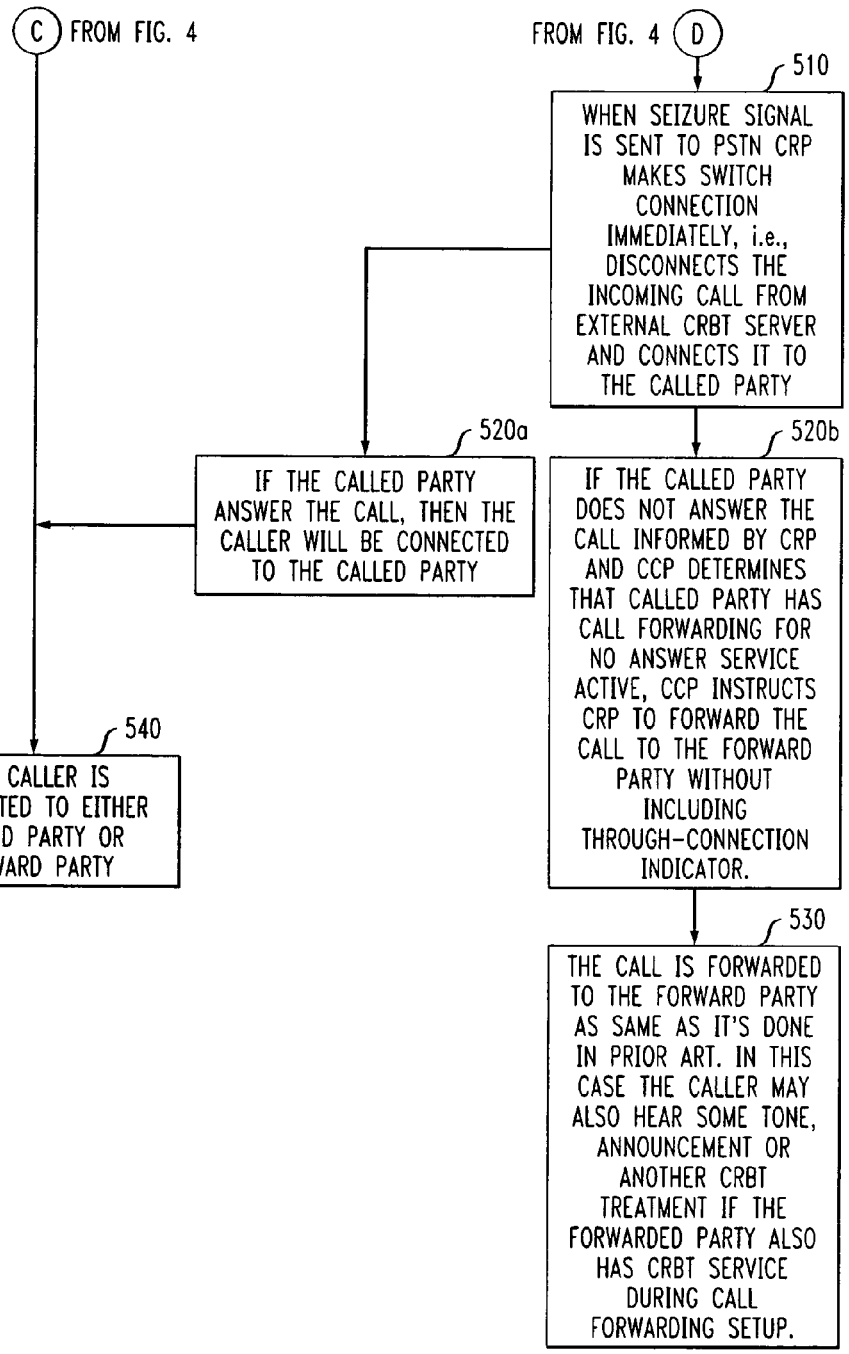

FIGS. 3, 4, and 5 illustrate in flow diagram form the operation of the Call Control Processor (CCP) 1062 and the Call Routing Processor (CRP) 1061 of the Originating Mobile Switch Center 106 for flexible through-connection/switch-connection operations.

At step 310, the calling subscriber station 102 initiates a mobile terminating call through Public Switched Telephone Network 104 to a called party, located at called mobile subscriber station 114. The incoming call arrives at the Originating Mobile Switch Center 106 through Public Switched Telephone Network 104, since Originating Mobile Switch Center 106 is the home Mobile Switch Center for the called mobile subscriber station 114. At step 330, the CRP 1061 of the Originating Mobile Switch Center 106 passes this incoming call to the CCP 1062. The CCP 1062 queries HLR 108 for the pre-provisioned information of called mobile subscriber station 114. At step 340, HLR 108 returns the queried information of the called mobile subscriber station 114, i.e., CRBT service active indicator and CRBT routing digits, back to the CCP 1062 of the Originating Mobile Switch Center 106.

At step 350, the CCP 1062 of Originating Switch 106 instructs the CRP 1061 to route the call to the external CRBT Server 110 with through-connection indicator set to "Through-connection upon Address Complete Message without switch-connection", which indicates that the call is to an external CRBT Server 110 and no switch-connection is required. The CRP 1061 at step 360 sends an Initial Address Message to Public Switched Telephone Network 104 to CRBT Server 110. When an Address Complete Message is received from CRBT Server 110, CRP 1061 connects (makes a through-connection) to the external CRBT Server 110 from the calling subscriber station 102. When the call is connected to CRBT Server 110, the CCP 1062 at step 370 queries HLR 108 again for location information of the called mobile subscriber station 114. In the present example, the called mobile subscriber station 114 is roaming and presently served by Terminating Mobile Switch Center 112. The HLR 108, therefore, returns the called mobile subscriber station's location information and a Temporary Local Directory Number (TLDN) number back to the CCP 1062 of the Originating Mobile Switch Center 106. If the outgoing trunk used for this connection is not ISDN User Part (ISUP) CCS7 signaling, e.g., MF signaling, as determined at step 380, processing advances to step 440; otherwise, processing continues to step 390.

At step 390, the CCP 1062 instructs the CRP 1061 to set up a call to the called mobile subscriber station 114 via received TLDN with through-connect indicator set to "Through-connection upon ANM with switch-connection", which indicates this is a call delivery and switch-connection is required.

At step 410 on FIG. 4, the CRP 1061 sends an Initial Address Message to Public Switched Telephone Network 104 to called mobile subscriber station 114 via Terminating Mobile Switch Center 112. There are two responses that are possible in response to the Initial Address Message. At step 420a, if the called mobile subscriber station 114 answers the call (ANM message is received), the CRP 1061 makes a switch-connection to the called mobile subscriber station 114 via Terminating Mobile Switch Center 112, and disconnects the external CRBT Server 110 from the incoming call and connects the incoming call to the called mobile subscriber station 114. The calling subscriber station 102 is connected to the called mobile subscriber station 114 and processing advances to step 540 as described below.

However, at step 420b, if the called mobile subscriber station 114 does not answer the call, the CRP 1061 informs the CCP 1062. The CCP 1062 queries HLR 108 and determines that called mobile subscriber station 114 has call forwarding for no answer service active, and the CCP 1062 instructs the CRP 1061 to forward the call to the forward subscriber station 116 with the through-connection indicator set to "Through-connection upon ACM received with switch-connection", which indicates that the call is a forwarding call and switch-connection is required. At step 430, the CRP 1061 sends an Initial Address Message to Public Switched Telephone Network 104 to forward subscriber station 116. When the call is being forwarded, i.e., Address Complete Message is received, the CRP 1061 makes switch-connection, disconnects external CRBT Server 110 from the incoming call, and connects the incoming call to the forward subscriber station 116. In this case, the calling subscriber station 102 may hear some tone, announcement, or another CRBT treatment if the forward-to subscriber station also has CRBT service active for the period of call forwarding call setup and processing advances to step 540.

When the outgoing trunk used for this connection is not ISDN User Part (ISUP) CCS7 signaling, e.g., MF signaling, as determined at step 380, processing advances to step 440 where the CCP 1062 instructs the CRP 1061 to set up a call to the called mobile subscriber station 114 via received TLDN with the through-connection indicator set to "Immediately through-connection with switch-connection", which indicates this is a call delivery using MF signaling and switch-connection is required. The CRP 1061 at step 510 sends a seizure signal (this is for MF Signaling such as R1 and R2) to the Public Switched Telephone Network 104 to called mobile subscriber station 114, which is connected via an MF trunk, makes switch-connection immediately, disconnects the external CRBT Server 110 from the incoming call, and connects the incoming call to the called mobile subscriber station 114.

There are two possible responses at this juncture, and at step 520a, if the called mobile subscriber station 114 answers the call, then the calling subscriber station 102 is connected to the called mobile subscriber station 114 and processing advances to step 540. Alternatively, at step 520b, if the called mobile subscriber station party 114 does not answer the call, then the CRP 1061 informs the CCP 1062, and the CCP 1062 determines that called mobile subscriber station 114 has call forwarding for no answer service active via query to its HLR 108, the CCP 1062 instructs the CRP 1061 to forward the call to the forward subscriber station 116 without including a through-connection indicator. The CRP 1061 at step 530 sends a seizure signal to the Public Switched Telephone Network 104 to forward subscriber station 116, which is connected via MF trunk, and makes a through-connection as same as prior art.

At step 540, CRBT Server 110 is disconnected and calling subscriber station 102 is connected to either the called mobile subscriber station 114 or the forward subscriber station 116.

SUMMARY

In existing Mobile Switch Centers, the call control processor of the Mobile Switch Center sends an inter-processor message to the call routing processor to instruct the call routing processor to disconnect or connect an outgoing call leg every time when a through-connection/switch-connection is required. Besides, between two instructional inter-processor messages, the call routing processor has to send message (s) back to the call control processor to inform the completion of the connection/disconnection operation. Because of these extra inter-processor messages, processing the system processor usage for this service is increased tremendously so that system performance/capacity is degraded. In addition, the calling subscriber station experiences a noticeable gap (a period of silence) during call set up when switch-connection is performed, which decreases the user's satisfaction. Furthermore, it is more complicated or difficult to maintain in the software when more through-connection flavors are introduced in the future for the service.

The present flexible through-connection process significantly reduces the inter-processor messages between the call control processor and the call routing processor of the Mobile Switch Center (by about 66%) so that system processor resources are utilized effectively; the disconnection and connection are performed almost at the same time so that the gap from the time the system disconnects one outgoing call leg to connect another outgoing call leg is reduced to minimum, which is unnoticeable to the user.

What is claimed:

1. A flexible through-connection process, operational in a Mobile Switch Center that contains a call control processor and a call routing processor, for making a through-connection to a destination at different stages of the call connection, comprising:

means, responsive to receipt of an incoming call at a Mobile Switch Center, for determining whether a called mobile subscriber station identified in said incoming call is provisioned to receive services from an external server for said incoming call, comprising:

means for transmitting a query to a Home Location Register of said Mobile Switch Center requesting pre-provisioned information of said called mobile subscriber station; and means, responsive to said incoming call being provisioned to receive services from an external server, for transmitting data at call setup time from said call control processor to said call routing processor indicative of a set of conditions under which said call routing processor, independent of said call control processor, performs a through-connection to said called mobile subscriber station and a set of conditions under which said call routing processor, independent of said call control processor performs a through connection to said external server followed by a switch connection to one of said called mobile subscriber station and an alternate destination pursuant to satisfaction of one of said set of conditions during the processing of said incoming call, comprising:

means, responsive to receipt of pre-provisioned information of said called mobile subscriber station indicative of said called mobile subscriber station being provisioned to receive services from an external server, for transmitting data from said call control processor to said call routing processor requesting said call routing processor to establish a call connection to said external server, and means for setting a through-connection indicator in said transmitted data to indicate a one of a through-connection and a switch-connection to be implemented during the processing of said incoming call upon occurrence of an associated condition.

2. The flexible through-connection process of claim 1, further comprising: means, located in said call routing processor and responsive to said transmitted data, for extending said incoming call connection from said calling subscriber station to said external server.

3. The flexible through-connection process of claim 2, further comprising:

means, located in said call routing processor and responsive to said transmitted data and occurrence of said associated condition, for implementing a one of a through-connection and a switch-connection identified in said transmitted data to redirect said incoming call to an alternate destination.

4. The flexible through-connection process of claim 3 wherein said means for implementing is responsive to a one of said associated conditions, including:

Initial Address Message (IAM) sent, Address Complete Message received, call answered, call is being forwarded, a seizure signal sent.

5. The flexible through-connection process of claim 3, further comprising:

means, located in said call routing processor and responsive to said transmitted data and occurrence of said associated condition, for automatically disconnecting said extended call connection to said external processor.

6. A flexible through-connection process, operational in a Mobile Switch Center that contains a call control processor and a call routing processor, for making a through-connection to a destination at different stages of the call connection, comprising:

determining, in response to receipt of an incoming call at a Mobile Switch Center, whether a called mobile subscriber station identified in said incoming call is provisioned to receive services from an external server for said incoming call, comprising:

transmitting a query to a Home Location Register of said Mobile Switch Center requesting pre-provisioned information of said called mobile subscriber station; and transmitting, in response to said incoming call being provisioned to receive services from an external server, data at call setup time from said call control processor to said call routing processor indicative of a set of conditions under which said call routing processor, independent of said call control processor, performs a through-connection and a set of conditions under which said call routing processor, independent of said call control processor performs a through-connection and a set of conditions under which said call routing processor, independent of said call control processor performs a switch-connection to said external server and said destination during the processing of said incoming call, comprising:

transmitting, in response to receipt of pre-provisioned information of said called mobile subscriber station indicative of said called mobile subscriber station being provisioned to receive services from an external server, data from said call control processor to said call routing processor requesting said call routing processor to establish a call connection to said external server, and setting a through-connection indicator in said transmitted data to indicate a one of a through-connection and a switch-connection to be implemented during the processing of said incoming call upon occurrence of an associated condition.

7. The flexible through-connection process of claim 1, further comprising: extending, in response to said transmitted data, said incoming call connection from said calling subscriber station to said external server.

8. The flexible through-connection process of claim 7, further comprising:

implementing, in response to said transmitted data and occurrence of said associated condition, a one of a through-connection and a switch-connection identified in said transmitted data to redirect said incoming call to an alternate destination.

9. The flexible through-connection process of claim 8 wherein said step of implementing is responsive to a one of said associated conditions, including: Initial Address Message (IAM) sent, Address Complete Message received, call answered, call is being forwarded, a seizure signal sent.

10. The flexible through-connection process of claim 8, further comprising:

automatically disconnecting, in response to said transmitted data and occurrence of said associated condition, said extended call connection to said external processor.

* * * * *

UNITED STATES PATENT AND TRADEMARK OFFICE
CERTIFICATE OF CORRECTION

PATENT NO. : 7,649,862 B2  Page 1 of 1
APPLICATION NO. : 11/132511
DATED : January 19, 2010
INVENTOR(S) : Guio et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 537 days.

Signed and Sealed this

Twenty-third Day of November, 2010

David J. Kappos
*Director of the United States Patent and Trademark Office*